(12) United States Patent
Mitchell

(10) Patent No.: US 7,213,285 B2
(45) Date of Patent: May 8, 2007

(54) PIVOTAL AND VERTICALLY TRANSLATABLE DOCK LEVELER LIP

(75) Inventor: Michael Mitchell, Milwaukee, WI (US)

(73) Assignee: Rite-Hite Holding Corporation, Milwaukee, WI (US)

(*) Notice: Subject to any disclaimer, the term of this patent is extended or adjusted under 35 U.S.C. 154(b) by 66 days.

(21) Appl. No.: 10/917,124

(22) Filed: Aug. 12, 2004

(65) Prior Publication Data

US 2006/0032004 A1    Feb. 16, 2006

(51) Int. Cl.
*E01D 1/00* (2006.01)
(52) U.S. Cl. .......................... 14/69.5; 14/71.1; 14/71.3
(58) Field of Classification Search ............... 14/69.5, 14/71.1, 71.3, 71.7, 72
See application file for complete search history.

(56) References Cited

U.S. PATENT DOCUMENTS

| | | |
|---|---|---|
| 1,993,261 A | 3/1935 | Colgate |
| 2,714,735 A | 8/1955 | Watson |
| 2,993,219 A | 7/1961 | Pennington |
| 3,280,414 A | 10/1966 | Layne |
| 3,388,413 A | 6/1968 | Clarke |
| 3,424,323 A | 1/1969 | Barnaby |
| 3,426,377 A | 2/1969 | Beckwith et al. |
| 3,486,181 A | 12/1969 | Hecker, Jr. et al. |
| 3,533,118 A | 10/1970 | Rosengen |
| 3,728,753 A | 4/1973 | Beckwith et al. |
| 3,763,514 A | 10/1973 | Bishop |
| 3,786,530 A | 1/1974 | Le Clear |
| 3,806,976 A | 4/1974 | Yoon |
| 3,835,497 A | 9/1974 | Smith |
| 3,872,948 A | 3/1975 | Richards |
| 3,967,337 A | 7/1976 | Artzberger |
| 4,020,517 A | 5/1977 | Waddell |
| 4,065,824 A | 1/1978 | Ellis et al. |
| 4,155,468 A | 5/1979 | Royce |
| RE30,104 E | 10/1979 | Burnham |
| 4,304,518 A | 12/1981 | Carder et al. |

(Continued)

FOREIGN PATENT DOCUMENTS

CA            0 935 606        10/1973

(Continued)

OTHER PUBLICATIONS

European Patent Office, *European Search Report*, Sep. 12, 2005, 3 Pages.

(Continued)

*Primary Examiner*—Raymond Addie
(74) *Attorney, Agent, or Firm*—Hanley, Flight & Zimmerman, LLC (57) ABSTRACT

A dock leveler includes a lip that not only pivots between an extended operative position and a pendant position relative to a deck but also translates in its pendant position between blocking and non-blocking positions. A fastener connects the lip to a hinge in such a way as to minimize the stress between the fastener and the lip. The hinge includes a lip-facing surface into which the fastener is anchored, wherein the fastener is tilted out of perpendicularity to the lip-facing surface. The head of the fastener is held parallel to the lip even though an angled gap may exist between the lip and the lip-facing surface of the hinge.

24 Claims, 5 Drawing Sheets

U.S. PATENT DOCUMENTS

| | | |
|---|---|---|
| 4,365,374 A | 12/1982 | Bennett |
| 4,402,100 A | 9/1983 | Slusar |
| 4,531,248 A | 7/1985 | Swessel et al. |
| 4,662,021 A | 5/1987 | Hagen et al. |
| 4,744,121 A | 5/1988 | Swessel et al. |
| 4,776,052 A | 10/1988 | Delgado et al. |
| 4,823,421 A | 4/1989 | Kleynjans et al. |
| 4,848,732 A | 7/1989 | Rossato |
| 4,865,507 A | 9/1989 | Trickle |
| 4,920,598 A * | 5/1990 | Hahn .................. 14/71.1 |
| 5,040,258 A | 8/1991 | Hahn et al. |
| 5,088,143 A | 2/1992 | Alexander |
| 5,157,801 A | 10/1992 | Alexander |
| 5,311,628 A | 5/1994 | Springer et al. |
| 5,323,503 A | 6/1994 | Springer |
| 5,333,339 A | 8/1994 | Larsen |
| 5,343,583 A | 9/1994 | Cook |
| 5,392,481 A | 2/1995 | Hageman |
| 5,452,489 A | 9/1995 | Gelder et al. |
| 5,457,838 A | 10/1995 | Gelder et al. |
| 5,544,381 A | 8/1996 | Alexander |
| 5,553,343 A | 9/1996 | Alexander |
| 5,832,554 A | 11/1998 | Alexander |
| 5,845,356 A | 12/1998 | Kielinski |
| 6,006,389 A | 12/1999 | Alexander |
| 6,065,172 A | 5/2000 | Swessel |
| 6,081,954 A | 7/2000 | Palmersheim et al. |
| 6,085,375 A | 7/2000 | Holm |
| 6,112,353 A | 9/2000 | Winter |
| 6,205,721 B1 | 3/2001 | Ashelin et al. |
| 6,370,719 B1 | 4/2002 | Alexander |
| 6,405,397 B1 | 6/2002 | Alexander |
| 6,442,783 B1 | 9/2002 | Yoon et al. |
| 6,594,842 B2 * | 7/2003 | Alexander .................. 14/71.3 |
| 2002/0124491 A1 | 9/2002 | Hahn et al. |

FOREIGN PATENT DOCUMENTS

| | | |
|---|---|---|
| CH | 0585661 | 3/1977 |
| DE | 2634652 A1 | 2/1978 |
| DE | 2852888 A1 | 8/1980 |
| DE | 2952658 A1 | 7/1981 |
| DE | 3412564 A1 | 10/1985 |
| EP | 0342476 A2 | 11/1989 |
| EP | 0366887 | 5/1990 |
| EP | 0366887 B1 | 10/1993 |
| FR | 7538541 | 7/1976 |
| FR | 2723360 A1 | 2/1996 |
| GB | 1469899 | 4/1977 |

OTHER PUBLICATIONS

European Patent Office, Communication, Dec. 9, 2005, 3 Pages.

* cited by examiner

PIVOTAL AND VERTICALLY TRANSLATABLE DOCK LEVELER LIP

BACKGROUND OF THE INVENTION

1. Field of the Invention

The subject invention generally pertains to dock levelers and more specifically to a reduced-stress connection between a hinge and a lip of a dock leveler.

2. Description of Related Art

A typical truck loading dock of a building includes an exterior doorway with an elevated platform for loading and unloading vehicles such as trucks and trailers. Many loading docks have a dock leveler to compensate for a height difference that may exist between the floor of the loading dock platform and an adjacent bed of a truck or trailer. A typical dock leveler includes a deck that is hinged along its back edge at or near the elevation of the floor so that the deck can pivotally adjust the height of its front edge to an elevation that generally matches the height of the rear edge of the truck bed to provide a ramp for material handling equipment.

In addition, a front hinge may pivotally connect an extension plate or lip to the front edge of the deck. The front hinge allows the lip to pivot between a stored, pendant position and an extended, operative position. In the extended position, the lip can rest upon the truck bed to form a bridge between the deck and the bed. This allows personnel and material handling equipment, such as a forklift truck, to readily move on and off the truck during loading and unloading operations.

With some dock levelers, the lip is connected to the deck in such a way that the lip can be used as a barrier to help prevent material handling equipment from accidentally driving off the edge of the deck while the deck is in its stored, cross-traffic position and no truck is parked at the dock. An example of such a dock leveler is disclosed in U. S. Pat. No. 4,920,598. With the '598 dock leveler, the lip includes a series of slots through which a corresponding series of bolts extend to fasten the lip to a deck hinge. The slots plus clearance between the underside of the lip and the hinge allow the lip to slide between a normal operating position and a raised barrier position.

When the lip is in its normal operating position and is extended to rest atop the back edge of a truck bed, tremendous stress can develop between the lip and the heads of the bolts that fasten the lip to the hinge when loads move over the dock leveler. The stress is concentrated along just a portion of the bolt head because the clearance between the lip and the hinge allow the lip to cock at a slight angle relative to the contact face of the bolt head. With the design disclosed in the '598 patent, the resulting stress concentrations require the use of heavier and/or stronger materials than would otherwise be needed.

SUMMARY OF THE INVENTION

In some embodiments, a dock leveler includes a lip that not only pivots between an extended, operative position and a pendant position relative to a deck but also translates from a non-blocking pendant position to a blocking pendant position. A fastener connects the lip to a hinge in such a way as to minimize the stress between the fastener and the lip.

In some embodiments, the hinge includes a lip-facing surface into which the fastener is anchored, wherein the fastener is tilted out of perpendicularity to the lip-facing surface.

In some embodiments, the head of the fastener is held parallel to the lip even though an angled gap may exist between the lip and the lip-facing surface of the hinge.

DESCRIPTION OF THE PREFERRED EMBODIMENT

Figure 2:
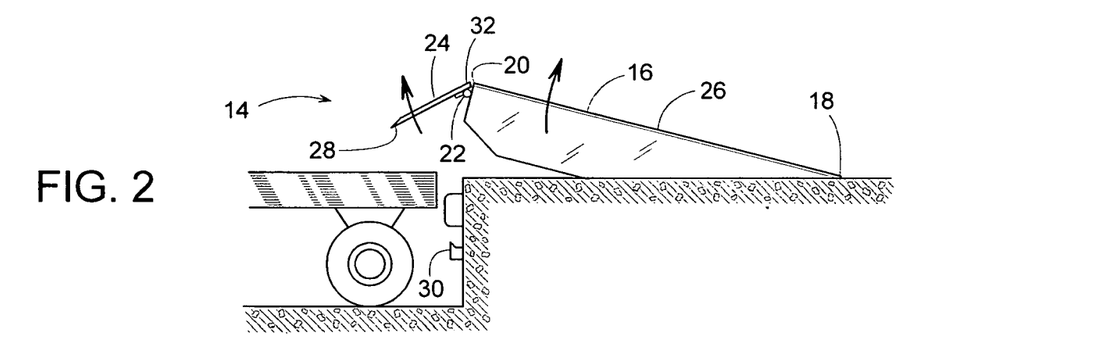
FIG. 2 is side view similar to FIG. 1 but showing the dock leveler's deck rising and the lip extending.
Figure 3:
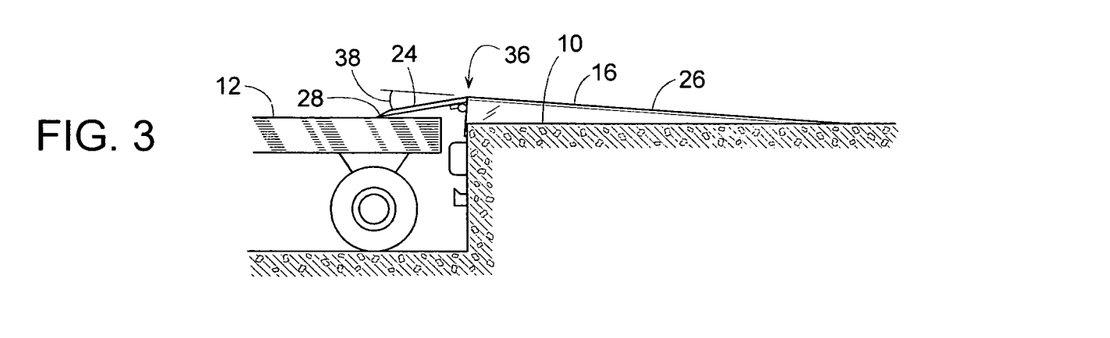
FIG. 3 is a side view similar to FIGS. 1 and 2 but showing the deck having lowered the lip upon the bed of the truck, wherein the lip is at an extended operative position.
Figure 4:
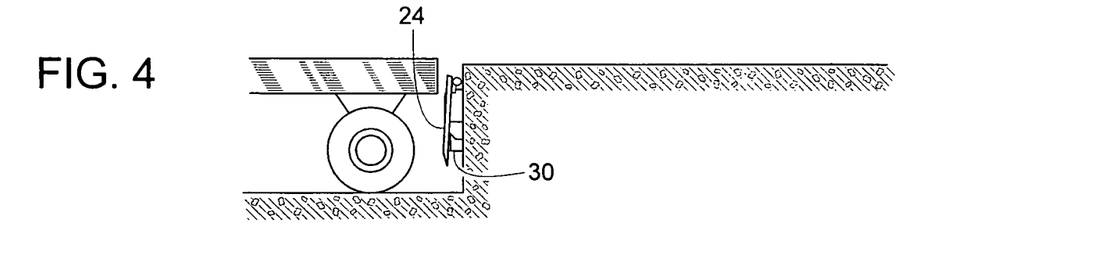
FIG. 4 is a side view of the dock leveler in a below-dock end-loading position with the lip at a non-blocking pendant position.

Referring to FIGS. 1–8, in order to compensate for a height differential that may exist between a loading dock platform 10 and the bed of a truck 12, a dock leveler 14 includes a ramp or deck 16 that can pivot about its back edge 18 to adjust the height of its front edge 20. To bridge the gap between the deck's front edge 20 and the rear edge of truck 12, a front hinge 22 pivotally connects a lip 24 to the deck's front edge 20. Deck 16 is movable to a cross-traffic position (FIG. 1), a raised position (FIG. 2), an operative position (FIG. 3), and a below-dock end-loading position (FIG. 4). Lip 24 can pivot between a pendant position (FIG. 4) and an extended operative position. Lip 24 can also translate between a blocking position (FIG. 1) and the non-blocking pendant position (FIG. 4).

Figure 1:
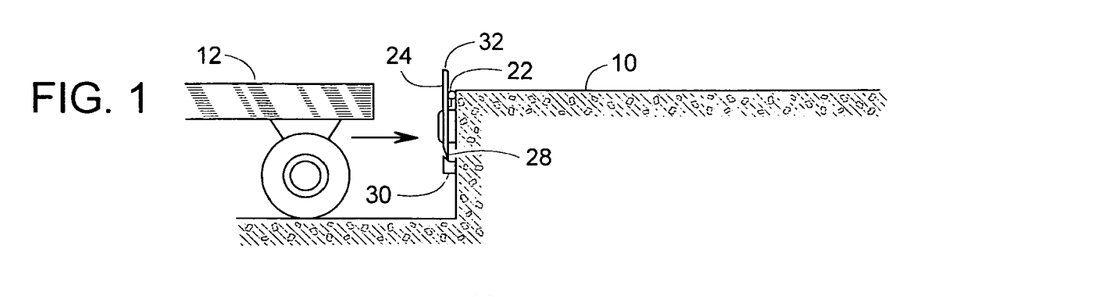
FIG. 1 is a side view of a truck backing into a loading dock, wherein the dock includes a dock leveler whose lip is in a blocking pendant position.

In operation, truck 12 backs into the loading dock, adjacent to platform 10, as shown in FIG. 1. At this point, deck 16 is at its stored, cross-traffic position where a driveway surface 26 of deck 16 is generally flush with the floor of platform 10, and a tip 28 of lip 24 rests upon a set of lip keepers 30, thereby supporting the deck to allow incidental traffic across the deck. To prevent items such as a forklift and other material handling equipment from accidentally falling over the deck's front edge 20, a back edge 32 of lip 24 protrudes above the deck's driveway surface 26 to create a barrier. This is accomplished by providing hinge 22 and lip 24 with a sliding connection 34 between the two, which will be explained later.

Next, in FIG. 2, deck 16 rises and lip 24 swings out to extend the tip 28 of lip 24 out over the top of the truck bed. The movement of lip 24 and deck 16 can be carried out in any of a wide variety of ways that are well known to those of ordinary skill in the art. The movement, for example, can be powered, manually driven, or a combination of the two. Mechanisms for moving deck 16 or lip 24 include, but are not limited to, hydraulic cylinder or bladder, pneumatic cylinder or bladder, mechanical linkage, drive screw, rack and pinion, winch, mechanical spring, gas spring, and various combinations thereof. Regardless of how deck 16 and lip 24 are moved, prior to extending the lip, deck 16 lifts lip 24 off keepers 30 where the sliding connection between hinge 22 and lip 24 allows the lip's weight to urge the lip's back edge 32 downward to where edge 32 is below the deck's driveway surface 16.

Then, in FIG. 3, deck 16 descends to place the extended lip 24 upon the bed of truck 12. Dock leveler 14 is now in its operative position where truck 12 can be loaded or unloaded of its cargo. In the operative position, it should be noted that lip 24 and the deck's traffic surface 26 create a crown 36 having a defining angle 38 of about 5-degrees. Crown 36 ensures that the lip's tip 28 engages the bed of truck 12 even when the truck bed is higher than dock platform 10.

FIG. 4 illustrates an end-loading position where the non-blocking pendant lip is lowered in front of and below lip keeper's 30. With lip 24 not resting atop the truck bed, loads can be added and removed from the very back end of the truck without interference from lip 24.

The sliding connection between lip 24 and hinge 22 can be as described in U.S. Pat. No. 4,920,598, which is specifically incorporated by reference herein; however, an improved, reduced stress sliding connection 34 is illustrated in FIGS. 5–8, and 10. In particular, connection 34 evenly distributes the contact stress between a head-engaging surface 42 (FIG. 8) of lip 24 and a lip-engaging surface 40 underneath a head 44 of a fastener 46, wherein fastener 46 connects lip 24 to a lip-hinge member 48, which, in turn, helps pivotally connect lip 24 to deck 16.

Figure 9:
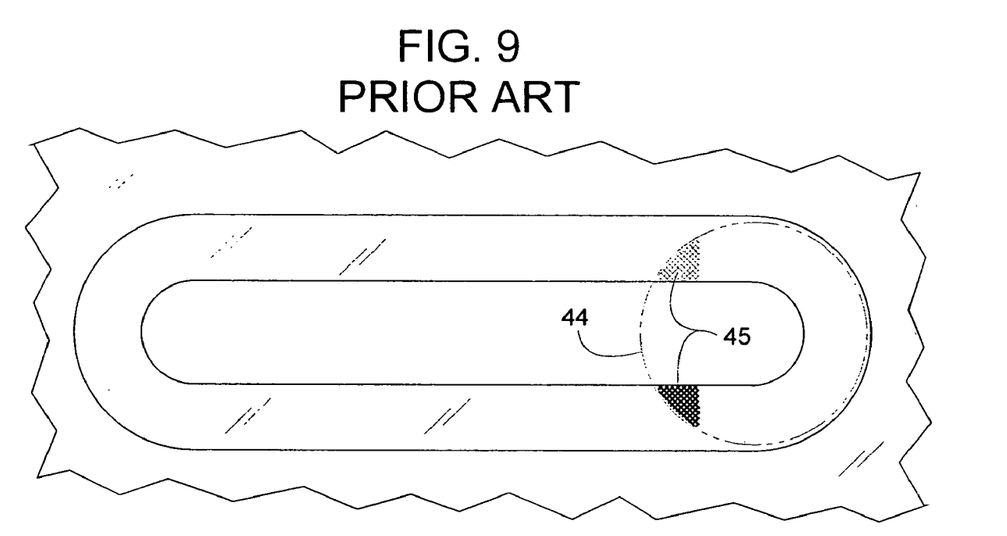
FIG. 9 shows the head-to-lip contact area of a prior art design.
Figure 10:
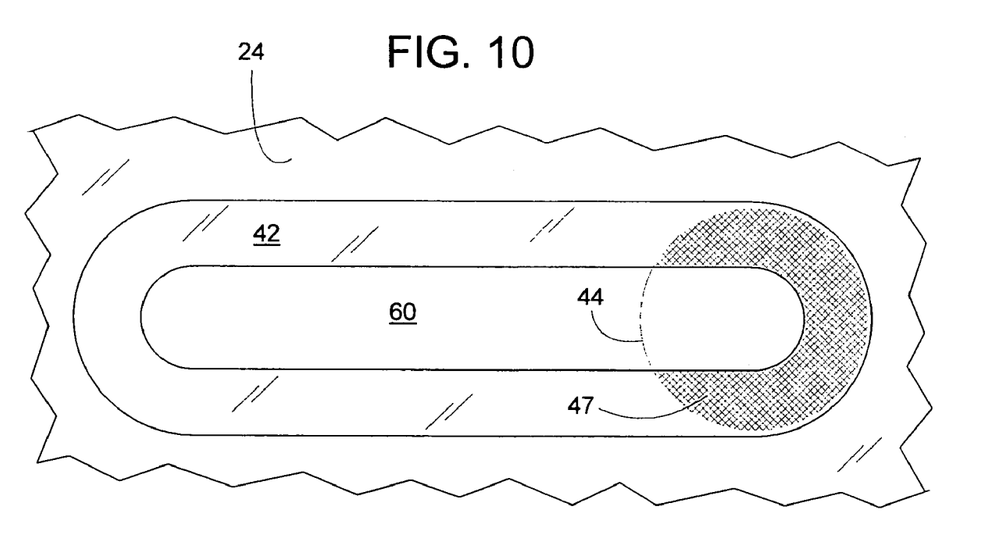
FIG. 10 is similar to FIG. 9 but showing a more broadly distributed head-to-lip contact area of the current design.

FIGS. 9 and 10 show a comparison of the contact stress areas of the old and new designs respectively. For the dock leveler of the '598 patent, FIG. 9 shows a shaded cross-hatched stress area 45 where the head of the fastener engages the lip. For the new design, FIG. 10 shows that dock leveler 14 has a more broadly distributed contact stress area 47, which greatly enhances the longevity of the crown defining angle 38 and reduces the fatigue of the material of the head engaging surface 24.

Although the actual hinge structure for connecting lip 24 to deck 16 may vary, in some embodiments, hinge 22 comprises a hinge pin 50 that pivotally joins a series of spools or deck-hinge members 52 to the series of lip-hinge members 48. Deck-hinge members 52 are disposed about pin 50 and can be welded (depicted by numeral 54) or otherwise attached to a header 56 of deck 16. Lip-hinge members 48 also include spools 58 disposed about pin 50, whereby pin 50 pivotally connects spools 58 of the lip-hinge members 48 to the series of deck-hinge members 52.

Figure 5:
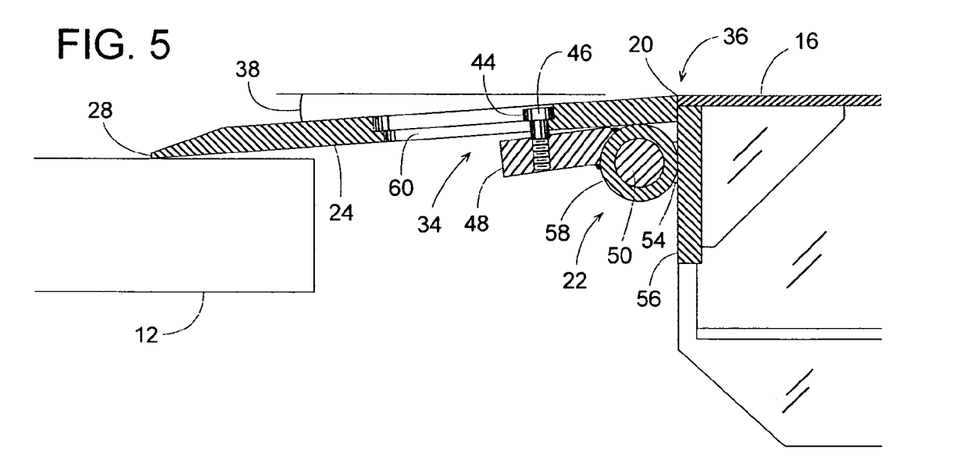
FIG. 5 is a cross-sectional side view taken along a centerline of a slot that is in the dock leveler lip while the lip is in the extended operative position.
Figure 6:
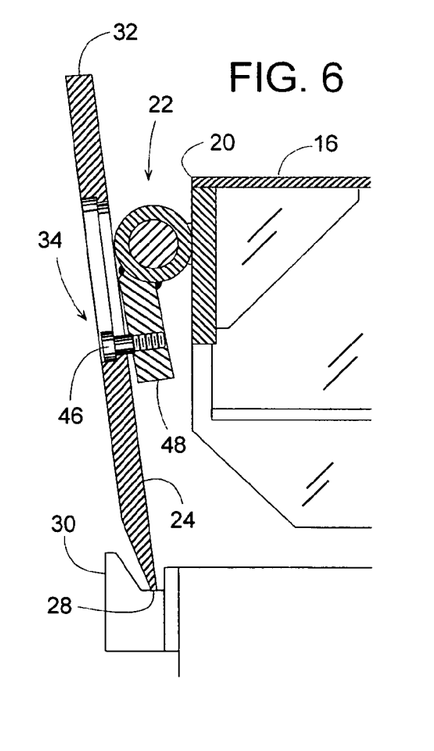
FIG. 6 is a cross-sectional view similar to FIG. 5 but showing the lip in its blocking pendant position.
Figure 7:
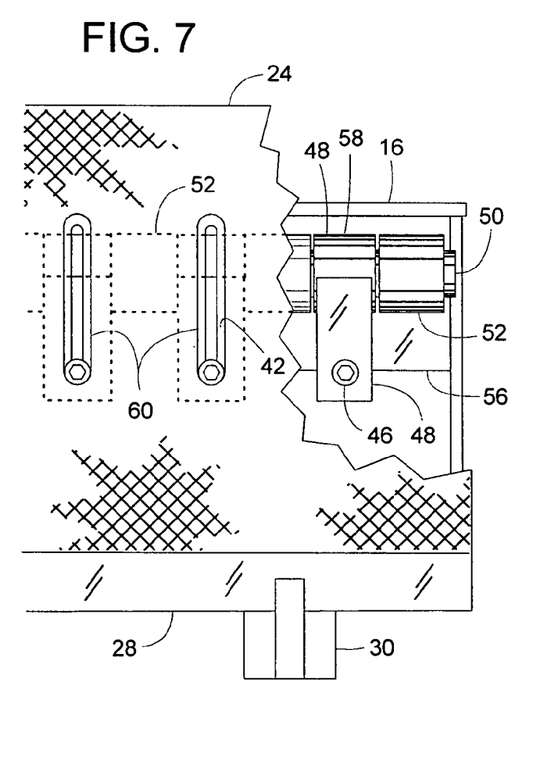
FIG. 7 is a front view of FIG. 6 but with a portion of the lip cut away.

To create sliding connection 34, lip 24 includes a series of slots 60 along which fasteners 46 can slide. In some embodiments, fastener 46 is a shoulder screw that includes head 44 and a shank 62. A threaded end of shank 62 screws into lip-hinge member 48, and head 44, and an upper portion of shank 62 slides within slot 60. To ensure sliding clearance between lip 24 and a lip-facing surface 64 of lip-hinge member 48, a gap 66 may exist between the two. Gap 66 defines an acute angle 68 when lip 24 and lip-hinge member 48 are in the extended operative position as shown in FIGS. 5 and 8.

Figure 8:
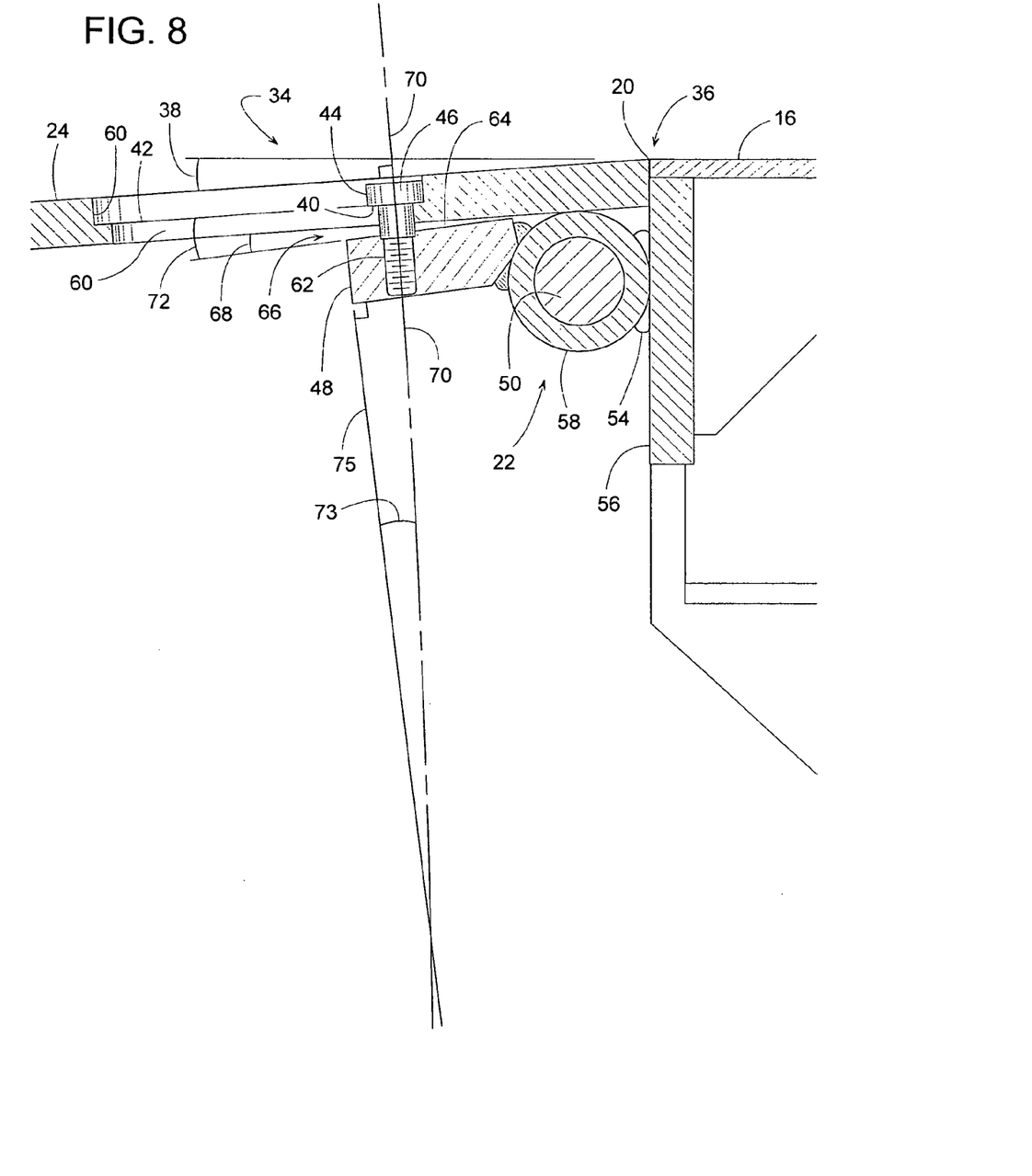
FIG. 8 is an enlarged cross-sectional view similar to FIG. 5.

To evenly distribute the circumferential contact stress between head 44 and lip 24 when lip 24 is in its extended operative position of FIG. 3, lip-engaging surface 40 of head 44 lies squarely on the integral head-engaging surface 42 of slot 60, as shown in FIG. 8. This is accomplished by having a longitudinal centerline 70 of fastener 46 be tilted out of perpendicularity with lip-facing surface 64 and by having lip-engaging surface 40 of head 44 be perpendicular to centerline 70. So that lip-engaging surface 40 is substantially coplanar with head-engaging surface 42, the amount of tilt (i.e., an angle 73) between centerline 70 and a line 75 perpendicular to surface 64 is substantially equal to acute angle 68. Since lip-engaging surface 40 is parallel with head-engaging surface 42, a head-to-hinge angle 72 is created between lip-engaging surface 40 and lip-facing surface 64, wherein the head-to-hinge angle 72 substantially equals acute angle 68.

Figure 11:
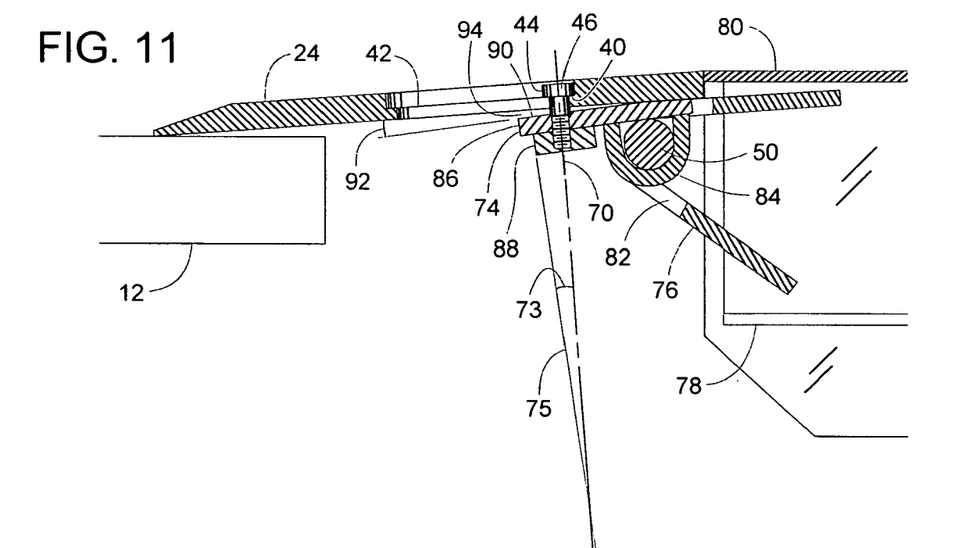
FIG. 11 is a cross-sectional view similar to FIG. 5 but showing another embodiment of the dock leveler.
Figure 12:
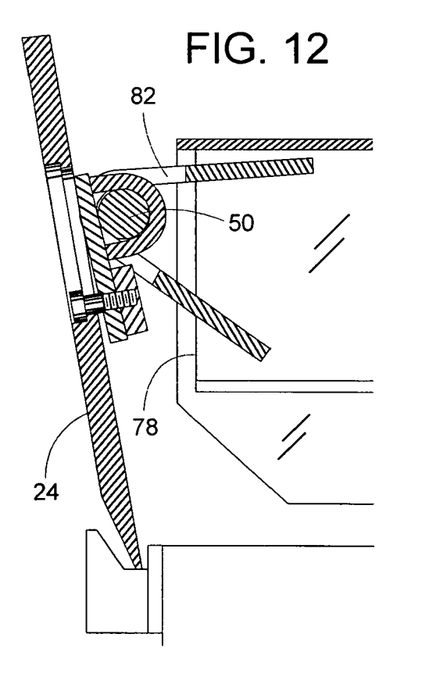
FIG. 12 is a cross-sectional view similar to FIG. 6 but showing the lip of the dock leveler of FIG. 11 in a blocking pendant position.
Figure 13:
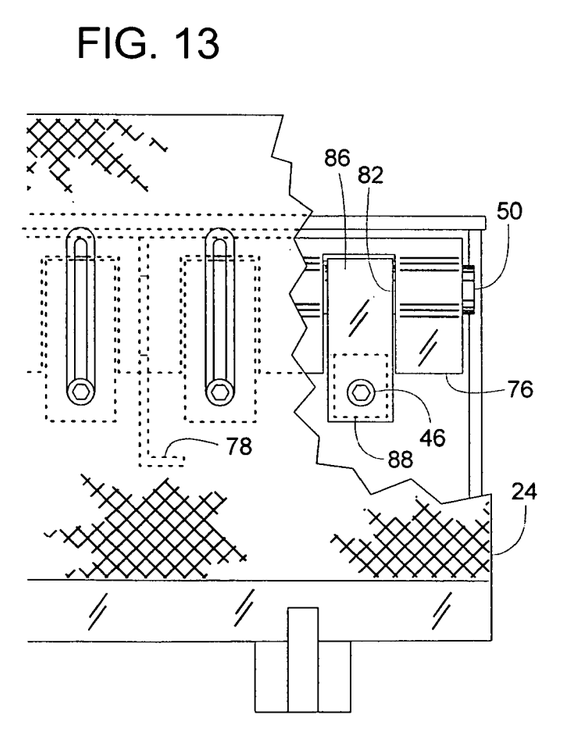
FIG. 13 is a front view of FIG. 12 but showing a portion of the lip cut away.

In another embodiment, shown in FIGS. 11–13 (which correspond to FIGS. 5–7 respectively), a lip-hinge member 74 replaces lip-hinge member 48, and a deck-hinge member 76 replaces deck-hinge member 52. Deck-hinge member 76 is a formed metal plate that partially wraps around hinge pin 50 and is welded to a series of deck-support beams 78 or otherwise attached to a deck 80. Deck-hinge member 76 has a series of openings 82 through which lip-hinge members 74 extend. In this example, each lip-hinge member 74 comprises a U-shaped piece 84, an upper plate 86, and a lower plate 88. U-shaped piece 84 extends from upper plate 86 and wraps partially around hinge pin 50 so that pin 50 pivotally couples lip-hinge member 74 to deck-hinge member 76. Lower plate 88 underneath upper plate 86 provides a threaded hole for holding fastener 46.

To ensure sliding clearance between lip 24 and a lip-facing surface 90 of lip-hinge member 86, a gap 94 may exist between the two. Gap 94 defines an acute angle 92 when lip 24 and lip-hinge member 86 are positioned in the extended operative position as shown in FIG. 11.

To evenly distribute the circumferential contact stress between head 44 and lip 24 when lip 24 is in its extended operative position, lip-engaging surface 40 of head 44 lies squarely on the integral head-engaging surface 42 of slot 60, as shown in FIG. 11. This is accomplished by having centerline 70 of fastener 46 be tilted out of perpendicularity with lip-facing surface 90 and by having lip-engaging surface 40 of head 44 be perpendicular to centerline 70. The amount of tilt is substantially equal to acute angle 92 so that lip-engaging surface 40 is substantially coplanar with head-engaging surface 42.

Although the invention is described with reference to a preferred embodiment, it should be appreciated by those of ordinary skill in the art that various modifications are well within the scope of the invention. A annular shim or conventional washer, for instance, could be placed underneath the head of the fastener, in which case the fastener would comprises the head, shank and washer (or shim), and the washer or shim would be considered as being part of the head. Therefore, the scope of the invention is to be determined by reference to the following claims:

The invention claimed is:

1. A dock leveler comprising:
   a deck that is movable between a raised position and a cross-traffic position;
   a lip defining a slot and being coupled to the deck such that the lip is pivotal between an extended operative position and a pendant position;
   a deck-hinge member attached to the deck;
   a lip-hinge member that includes a lip-facing surface;
   a hinge pin pivotally coupling the deck-hinge member to the lip-hinge member; and
   a fastener that comprises a shank and a head disposed along a longitudinal centerline of the fastener, wherein the fastener extends from the lip-hinge member into the slot, such that a head of the fastener is disposed within the slot to connect the lip to the lip-hinge member such that the fastener and the slot permit relative sliding motion between the lip and the lip-hinge member, and the fastener's longitudinal centerline is tilted out of perpendicularity to the lip-facing surface, such that the fastener head is closer to the hinge pin than it would be were the longitudinal centerline perpendicular to the lip-facing surface.

2. The dock leveler of claim 1, wherein the lip is inhibited from sliding relative to the deck when the lip is in the extended operative position.

3. The dock leveler of claim 1, wherein the lip includes a head-engaging surface integral to the lip and disposed around the slot, and the head includes a lip-engaging surface that engages the head-engaging surface, wherein the lip-engaging surface is substantially parallel to the head-engaging surface when the lip is in the extended operative position.

4. The dock leveler of claim 3, wherein the head-engaging surface is substantially perpendicular to the longitudinal centerline of the fastener.

5. The dock leveler of claim 1, wherein the lip in the extended operative position and the lip-facing surface define a gap therebetween, wherein the gap includes an acute angle.

6. The dock leveler of claim 5, wherein the lip includes a head-engaging surface integral to the lip and disposed around the slot, and the head includes a lip-engaging surface that engages the head-engaging surface, wherein the lip-engaging surface is substantially parallel to the head-engaging surface when the lip is in the extended operative position, and the lip-facing surface of the lip-hinge member and the lip-engaging surface of the head create a head-to-hinge angle when the lip is at the extended operative position, wherein the head-to-hinge angle substantially equals the acute angle of the gap.

7. The dock leveler of claim 5, wherein the gap facilitates relative sliding motion between the lip and the lip-hinge member.

8. The dock leveler of claim 1, wherein the lip is adapted to extend above the deck to provide a barrier when the deck is in the cross-traffic position.

9. The dock leveler of claim 8, wherein the deck is adapted to extend above the lip.

10. The dock leveler of claim 9, wherein the deck extends above the lip when the lip is in a non-blocking pendant position.

11. A dock leveler, comprising:
    a deck that is movable between a raised position and a cross-traffic position;
    a lip defining a slot and being coupled to the deck such that the lip is pivotal between an extended operative position and a non-blocking pendant position and is translatable between the non-blocking pendant position and a blocking pendant position relative to the deck;
    a deck-hinge member attached to the deck;
    a lip-hinge member that includes a lip-facing surface;
    a hinge pin pivotally coupling the deck-hinge member to the lip-hinge member; and
    a fastener that comprises a shank and a head disposed along a longitudinal centerline of the fastener, wherein the fastener extends from the lip-hinge member into the slot, such that a head of the fastener is disposed within the slot to connect the lip to the lip-hinge member such that:
      a. the fastener and the slot permit relative sliding motion between the lip and the lip-hinge member,
      b. the lip-facing surface engages the lip, and
      c. the fastener's longitudinal centerline is tilted out of perpendicularity to the lip-facing surface, such that the fastener head is closer to the hinge pin than it would be were the longitudinal centerline perpendicular to the lip-facing surface.

12. The dock leveler of claim 11, wherein the lip includes a head-engaging surface integral to the lip and disposed around the slot, and the head includes a lip-engaging surface that engages the head-engaging surface, wherein the lip-engaging surface is substantially parallel to the head-engaging surface when the lip is in the extended position.

13. The dock leveler of claim 12, wherein the head-engaging surface is substantially perpendicular to the longitudinal centerline of the fastener.

14. The dock leveler of claim 11, wherein the lip in the extended operative position and the lip-facing surface define a gap therebetween, wherein the gap includes an acute angle.

15. The dock leveler of claim 14, wherein the lip includes a head-engaging surface integral to the lip and disposed around the slot, and the head includes a lip-engaging surface that engages the head-engaging surface, wherein the lip-engaging surface is substantially parallel to the head-engaging surface when the lip is in the extended position, and the lip-facing surface of the lip-hinge member and the lip-engaging surface of the head create a head-to-hinge angle when the lip is at the extended position, wherein the head-to-hinge angle substantially equals the acute angle of the gap.

16. The dock leveler of claim 14, wherein the gap facilitates relative sliding motion between the lip and the lip-hinge member.

17. The dock leveler of claim 11, wherein the lip extends above the deck when the deck is in the cross-traffic position and the lip is in the blocking pendant position.

18. The dock leveler of claim 17, wherein the deck extends above the lip when the lip is in the non-blocking pendant position.

19. The dock leveler of claim 11, wherein the lip is inhibited from sliding relative to the deck when the lip is in the extended operative position.

20. A dock leveler, comprising:
    a deck that is movable between a raised position and a cross-traffic position;
    a lip defining a slot and being coupled to the deck such that the lip is pivotal between an extended position and a pendant position and is translatable between the pendant position and a blocking position relative to the deck, wherein the lip includes a head-engaging surface integral to the lip and disposed around the slot;

a deck-hinge member attached to the deck;
a lip-hinge member that includes a lip-facing surface;
a hinge pin pivotally coupling the deck-hinge member to the lip-hinge member; and
a fastener that comprises a shank and a head disposed along a longitudinal centerline of the fastener, and the head includes a lip-engaging surface that engages the head-engaging surface of the lip, wherein the fastener extends from the lip-hinge member into the slot to connect the lip to the lip-hinge member such that:
 a. the fastener and the slot permit relative sliding motion between the lip and the lip-hinge member,
 b. the lip-facing surface engages the lip,
 c. the fastener's longitudinal centerline is tilted out of perpendicularity to the lip-facing surface, such that the fastener head is closer to the hinge pin than it would be were the longitudinal centerline perpendicular to the lip-facing surface,
 d. the lip-engaging surface is substantially parallel to the head-engaging surface when the lip is in the extended operative position,
 e. the head-engaging surface is substantially perpendicular to the longitudinal centerline of the fastener,
 f. when the lip is in the extended operative position, the lip and the lip-facing surface define a gap therebetween, wherein the gap includes an acute angle, and
 g. the lip-facing surface of the lip-hinge member and the lip-engaging surface of the head create a head-to-hinge angle when the lip is at the extended operative position, wherein the head-to-hinge angle substantially equals the acute angle of the gap.

21. The dock leveler of claim 20, wherein the gap facilitates relative sliding motion between the lip and the lip-hinge member.

22. The dock leveler of claim 20, wherein the lip extends above the deck when the deck is in the cross-traffic position and the lip is in the blocking pendant position.

23. The dock leveler of claim 20, wherein the deck extends above the lip when the lip is in the non-blocking pendant position.

24. The dock leveler of claim 20, wherein the lip is inhibited from sliding relative to the deck when the lip is in the extended operative position.

* * * * *